(12) United States Patent
Fritz et al.

(10) Patent No.: US 9,389,115 B2
(45) Date of Patent: Jul. 12, 2016

(54) TWO WIRE TEMPERATURE AND FLUID LEVEL LIMIT SWITCH

(71) Applicant: Eaton Corporation, Cleveland, OH (US)

(72) Inventors: Todd Fritz, Kalamazoo, MI (US); John Manyala, Kalamazoo, MI (US); Ryan Pauls, Kalamazoo, MI (US); Eric Metheny, Coldwater, MI (US)

(73) Assignee: Eaton Corporation, Cleveland, OH (US)

( * ) Notice: Subject to any disclaimer, the term of this patent is extended or adjusted under 35 U.S.C. 154(b) by 225 days.

(21) Appl. No.: 14/181,177

(22) Filed: Feb. 14, 2014

(65) Prior Publication Data

US 2014/0230543 A1 Aug. 21, 2014

Related U.S. Application Data

(60) Provisional application No. 61/866,066, filed on Aug. 15, 2013, provisional application No. 61/811,838, filed on Apr. 15, 2013, provisional application No. 61/766,817, filed on Feb. 20, 2013, provisional application No. 61/765,226, filed on Feb. 15, 2013.

(51) Int. Cl.
| | |
|---|---|
| *G01M 15/02* | (2006.01) |
| *G01F 23/38* | (2006.01) |
| *G01F 23/62* | (2006.01) |
| *G01D 21/02* | (2006.01) |
| *G01K 3/00* | (2006.01) |
| *G01K 7/24* | (2006.01) |
| *G01F 23/74* | (2006.01) |

(52) U.S. Cl.
CPC ............... *G01F 23/38* (2013.01); *G01D 21/02* (2013.01); *G01F 23/62* (2013.01); *G01F 23/74* (2013.01); *G01K 3/005* (2013.01); *G01K 7/24* (2013.01); *G01K 2205/00* (2013.01)

(58) Field of Classification Search
USPC ............. 73/114.54, 114.56, 290 R, 292, 295
See application file for complete search history.

(56) References Cited

U.S. PATENT DOCUMENTS

| | | | |
|---|---|---|---|
| 3,818,470 A * | 6/1974 | Hirsbrunner et al. | 340/619 |
| 4,285,207 A | 8/1981 | Sugiura et al. | |
| 5,111,692 A * | 5/1992 | McQueen et al. | 73/295 |
| 5,311,762 A * | 5/1994 | Drexel | 73/1.34 |
| 2010/0082271 A1* | 4/2010 | McCann et al. | 702/55 |
| 2010/0223991 A1* | 9/2010 | Muraoka et al. | 73/204.11 |

FOREIGN PATENT DOCUMENTS

| | | |
|---|---|---|
| JP | H07110256 | 4/1995 |
| JP | H09306639 A | 11/1997 |
| JP | 2002357474 | 12/2002 |

OTHER PUBLICATIONS

International Search Report for PCT/US2014/016508 mailed May 16, 2014.
English Abstract for JPH09306639A.
English Abstract for JPH07110256A.
English Abstract for JP2002357474A.

* cited by examiner

*Primary Examiner* — Eric S McCall
(74) *Attorney, Agent, or Firm* — Fishman Stewart PLLC

(57) ABSTRACT

A two-wire system for monitoring fluid level and temperature including a pair of electrical interconnect wires bridged by a fluid level switch and a thermal sensing element. One of the fluid level switch or the thermal sensing element bypasses the other during a trigger event.

21 Claims, 4 Drawing Sheets

TWO WIRE TEMPERATURE AND FLUID LEVEL LIMIT SWITCH

CROSS-REFERENCE TO RELATED APPLICATIONS

This application claims the priority of U.S. Provisional Applications 61/765,226 filed on Feb. 15, 2013; 61/766,817 filed on Feb. 20, 2013; 61/811,838 filed on Apr. 15, 2013; and 61/866,066 filed on Aug. 15, 2013, the disclosures of which are incorporated herein in their entirety.

BACKGROUND

The disclosure relates generally to a system and method that for monitoring fluid levels and fluid temperature, and more particularly, to a system, method, and controller for utilizing a two-wire electronic system that senses both fluid temperature and low fluid levels.

Vehicles utilize a variety of fluids for routine operations, including but not limited to, transmission fluid, engine oil, and brake fluid. Normal vehicle operations commonly result in the loss of portions of these fluid reserves over time. In order to preserve the optimal operation of the vehicle, it is known that the levels of these fluids must be maintained above a minimum threshold. In addition to monitoring the levels of these fluids, the temperature of these fluids is often monitored. The functional properties and viscosity of fluids varies under the environmental and operating conditions of the vehicle.

Existing systems often require complex electrical systems in order to properly monitor fluid level and temperature. This can be the result of vehicle movement, which naturally causes fluid levels to vary during operation. In addition, as temperatures decrease the viscosity of fluids commonly increases and reduces the fluid flow rate. In the case of transmission fluid, the slow fluid flow rate at low temperature conditions may reduce the levels at the sump where the pump and fluid level switch are commonly located. In this case, the fluid level may indicate low levels even when adequate fluid is available for lubrication.

Similarly, fluid temperature readings may be adversely impacted by low fluid levels. If the fluid level changes such that it no longer can be monitored by a temperature sensor (e.g. drops below the location of a temperature sensor such that the temperature sensor is out of the fluid) the readings it produces may no longer be valid. In this fashion, fluid levels and fluid temperature monitoring provide challenges to existing systems. Complex and redundant monitoring and sensor systems may be implemented. However, the increased complexity often results in increased cost. In addition, these systems often require complex wiring throughout the vehicle. When an electrical short or an error arises in such systems it can be both difficult and costly to address.

It would, therefore, be desirable to have a system capable of accurately monitoring both fluid level and temperature without the need of complex and costly wiring. It would further be desirable for such a system to be easily installed and diagnosed in the case of shorts or improper installation.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

The present disclosure is directed to a two-wire system for monitoring fluid levels and fluid temperature. The present disclosure is primarily directed at monitoring transmission fluid or engine oil, although it is applicable to a variety of fluids. In addition, although it is primarily directed toward a system for monitoring fluid levels and fluid temperature in moving vehicles, it would be understood by an artisan to be applicable to any system in which fluid level and fluid temperature need to be monitored.

Figure 1:
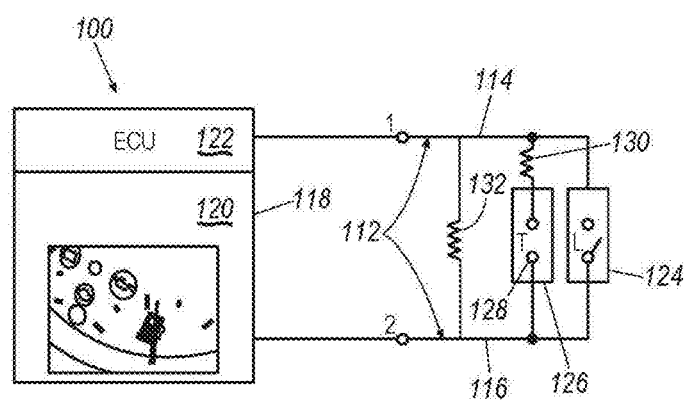
FIG. 1 illustrates a two-wire system for monitoring fluid levels and fluid temperature with a low temperature override of low fluid levels.

FIG. 1 illustrates a two-wire system 100 for monitoring fluid levels and fluid temperature. The two-wire system 100 is designed to minimize false fluid level readings. The two-wire system 100 includes a pair of electrical interconnect wires 112 including a first electrical interconnect wire 114 and a second electrical interconnect wire 116. The two-wire system 100 is a single pair of wires 112 capable of monitoring multiple fluid characteristics using a single circuit. The pair of electrical interconnect wires 112 may be in communication with a monitoring device 118 such as an analog measurement unit represented by a dial 120 or alternately an electronic control unit 122. Although two types of monitoring devices 118 are illustrated, it should be understood that a variety of substitute devices would be obvious to an artisan in light of the present disclosure.

The two-wire system 100 includes a fluid level switch 124 bridging the pair of electrical interconnect wires 112. The fluid level switch 124 provides an electrical pathway between the pair of electrical interconnect wires 112. It is contemplated that the fluid level switch 124 is intended to be located within the body of fluid, such as the transmission fluid, to be monitored within the vehicle. The two-wire system 100 further includes a thermal sensing element 126 bridging the pair of electrical interconnect wires 112. The thermal sensing element 126 provides a second electrical pathway between the pair of electrical interconnect wires 112. Although a variety of thermal sensing elements 126 are contemplated, in one exemplary example the thermal sensing element 126 comprises a thermal limit switch 128. The present exemplary illustration combines the fluid level switch 124 and the thermal limit switch 128 into a single component.

The fluid level switch 124 may be biased closed and is triggered to open at a fluid trigger level, such as when the fluid drops below a minimum desired level. When the fluid level switch 124 is triggered open it signals the monitoring device 118 to indicate a low fluid level. However, it is understood that at low temperatures the viscosity of the monitored fluid increases and the flow rate decreases through a given system. It is known that this may result in lower fluid levels where the fluid level switch 124 is mounted even if adequate lubricating fluid is present in the overall system and could cause an incorrect indication of low fluid. The present exemplary illustration, therefore is configured such that the thermal limit switch 128 is biased open and is triggered to close at a trigger temperature, such as a pre-set minimum temperature. If the operating temperature of the fluid drops below the trigger temperature, the thermal limit switch 128 is triggered to close and the two-wire system 100 bypasses the fluid level switch 124 to prevent a false indication of low fluid levels.

The monitoring device 118 provides an electrical bias and electrical reference node to the pair of electrical interconnect wires 112. The monitoring device 118 could measure voltage across the device or current through the device to determine fluid level switch 124 state. A thermal limit bias resistor 130 may be utilized in conjunction with the thermal limit switch 128 to provide a measurement signal that the thermal limit switch 128 has been activated. A sensor bias resistor 132 may also be used to bridge the pair of electrical interconnect wires 112. The sensor bias resistor 132 may be utilized to provide a circuit path when the fluid level switch 124 is open to be used in diagnosing the switch connection. It is contemplated that the sensor bias resistor 132 may differ in resistance, such as a greater resistance, from that the closed switch contact resistance of the fluid level switch 124. This allows the circuit to be diagnosed by monitoring the resistance across the pair of electrical interconnect wires 12. The thermal limit bias resistor 130 may be similar to the resistance of the closed switch contact resistance of the fluid level switch 124 if it is desired that the low temperature warning and the low fluid level share a common warning light. Alternatively, it is contemplated that the thermal limit bias resistor 130 may be different, such as greater, than the closed switch contact resistance of the fluid level switch 124 in order to allow for signal differentiation between the fluid level switch 124 and the thermal limit either for indicator purposes or for system diagnosis.

Figure 2:
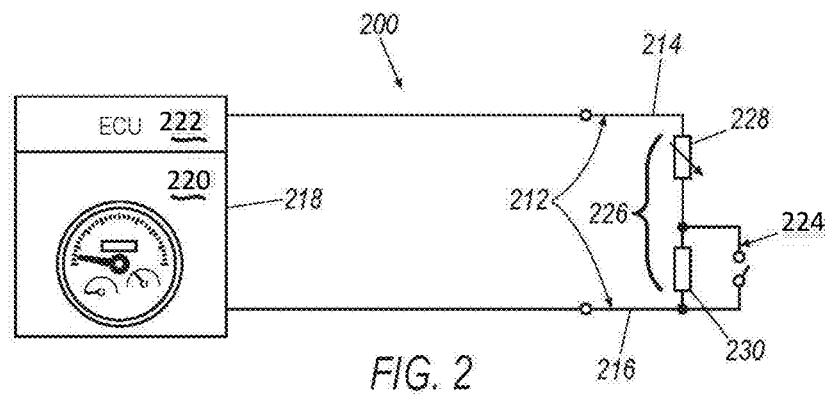
FIG. 2 illustrates a two-wire system for monitoring fluid levels and fluid temperature with a fluid level limit switch override of fluid temperature levels.

FIG. 2 illustrates an exemplary illustration of a two-wire system 200 for monitoring fluid levels and fluid temperature. This system 200 is configured to minimize false temperature readings while providing a continuous reading for fluid temperature. The two-wire system 200 includes a pair of electrical interconnect wires 212 with a first electrical interconnect wire 214 and a second electrical interconnect wire 216. The pair of electrical interconnect wires 212 may be in communication with a monitoring device 218 such as an analog measuring device represented by a dial 220 or alternately an electronic control unit 222. Although two types of monitoring devices 218 are illustrated, it should be understood that a variety of substitute devices would be obvious to an artisan in light of the present disclosure.

The two-wire system 200 includes a fluid level switch 224 in communication with the pair of electrical interconnect wires 212. It is contemplated that the fluid level switch 224 is intended to be located within the body of fluid, such as the transmission fluid, to be monitored within the vehicle. The two-wire system 200 further includes a thermal sensing element 226 in communication with the pair of electrical interconnect wires 212. The thermal sensing element 226 may be comprised of a thermal variable sensing element 228 and a thermal non-variable resistive element 230 or thermal bias. As shown in the exemplary approach, thermal sensing element 226 provides a continuous indication of fluid temperature.

Figure 3:
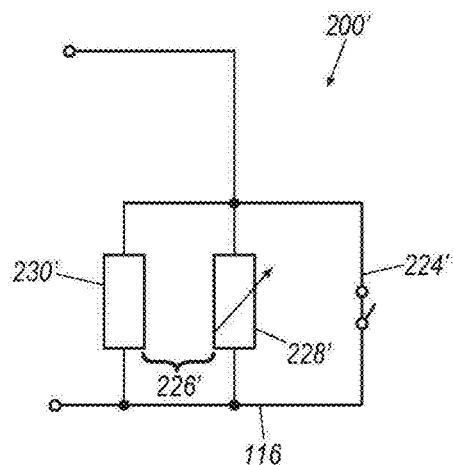
FIG. 3 illustrates an alternate configuration of the two-wire system illustrated in FIG. 2.

In the illustration represented by system 200, the fluid level switch 224 is biased open and triggered to close at a pre-set fluid trigger level. The thermal sensing element 226 provides a signal to the monitoring device 218 reflective of the temperature of the transmission or other fluid. However, when the fluid level drops below a predetermined threshold (pre-set fluid trigger level) the fluid level switch 224 is triggered to close and bypasses at least a portion of the thermal sensing element 226 such that the temperature signal is suppressed and an indication of low fluid level can be displayed. This prevents temperature indications when the thermal sensing element 226 may no longer be properly submerged in the monitored fluid. A refinement of system 200 is illustrated as system 200' in FIG. 3, with refined components distinguished by a prime slash. The fluid level switch 224' may be configured to bypass the thermal sensing element 226' entirely by configuring the fluid level switch 224', the thermal variable sensing element 228' and a thermal non-variable resistive element 230' all in parallel.

Figure 4A:
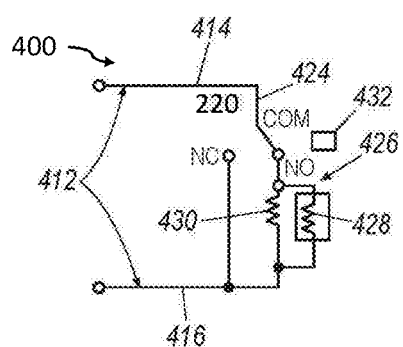
FIGS. 4a and 4b illustrate a two-wire system for monitoring fluid levels and fluid temperature with a magnetic float trigger.
Figure 4B:
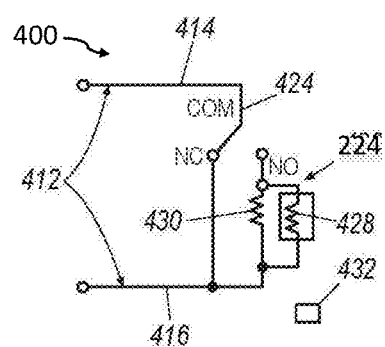

FIGS. 4a and 4b are an additional illustration of a two-wire system 400 for monitoring fluid levels and fluid temperature. The system 400 allows for the use of a sealed circuit that need not be exposed to the fluid which it monitors. The two-wire system 400 includes a pair of electrical interconnect wires 412 including a first electrical interconnect wire 414 and a second electrical interconnect wire 416. The two-wire system 400 includes a fluid level switch 424 bridging the pair of electrical interconnect wires 412. It is contemplated that the fluid level switch 424 is intended to be located within the body of fluid, such as the transmission fluid, to be monitored within the vehicle. The two-wire system 400 further includes a thermal sensing element 426 bridging the pair of electrical interconnect wires 412. The thermal sensing element 426 may be comprised of a thermal variable sensing element 428 and a thermal non-variable resistive element 430 or thermal bias. The thermal sensing element 426 provides a continuous indication of fluid temperature.

In the present exemplary illustration the fluid level switch 424 is contemplated to comprise a reed switch that is responsive to a magnetic float 432. The use of a magnetic float 432 allows the two-wire system 400 to be sealed from exposure to the fluid in which it is submerged. The fluid level switch 424 is biased by the magnetic float 432 into an open position, FIG. 4a, where it provides current flow through the thermal sensing element 426 to provide a continuous reading of fluid temperatures. However, when the magnetic float 432 drops due to low fluid levels, FIG. 4b, that fluid level switch 424 is triggered to close and bypass the thermal sensing element 426 to prevent aberrant readings.

Figure 5A:
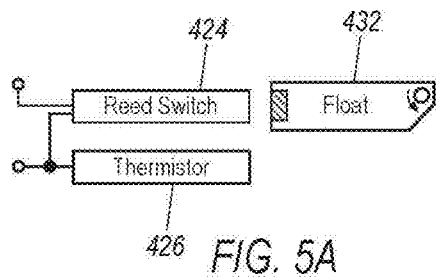
FIGS. 5a-5c illustrate a variety of magnetic float configurations for use in the two-wire system illustrated in FIGS. 4a and 4b.
Figure 5B:
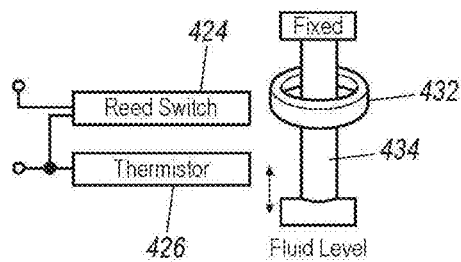
Figure 5C:
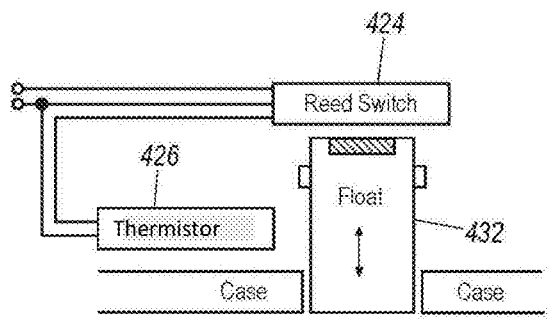

Although a variety of magnetic float 432 and reed switch 424 configurations are contemplated, an exemplary set of configurations are illustrated in FIGS. 5a-5c. The magnetic float 432 may comprise a pivoting float as is illustrated in FIG. 5a. The pivoting float allows for a simple but effective float installation within the sump containing fluid. Alternatively, the magnetic float 432 could comprise a toroidal float positioned on a cylindrical guide 434. The combination of toroidal float and guide insures the float is maintained in the center of the fluid and minimizes the susceptibility to splashing evens. Finally a traditional vertical float arrangement is illustrated in FIG. 5c which allows for the utilization of a wide variety of existing magnetic float components. These illustrations are for exemplary purposes only and do no serve to limit the present disclosure.

Figure 6:
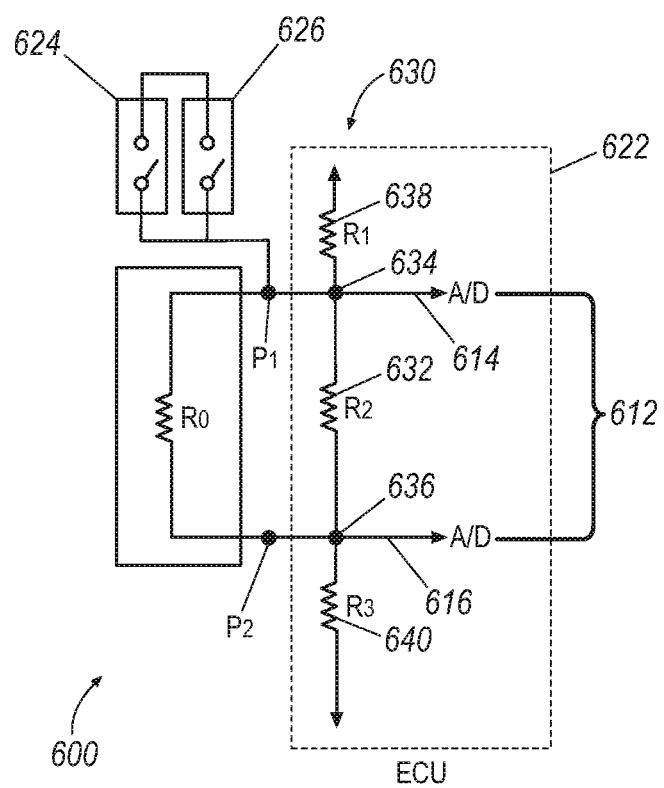
FIG. 6 illustrates a two-wire system for monitoring fluid levels and fluid temperature with diagnostic resistors for use in any of the two-wire systems illustrated above.

FIG. 6 illustrates a two-wire system 600 for monitoring fluid levels and fluid temperature with diagnostic resistors for use in the systems illustrated in FIGS. 1-5. Utilizing diagnostic resistors alongside the disclosed circuits allows for monitoring voltages and using them to diagnose potential problems within the circuit. The two-wire system 600 includes a pair of electrical interconnect wires 612 including a first electrical interconnect wire 614 and a second electrical interconnect wire 616. The two-wire system 600 includes a fluid level switch 624 bridging the pair of electrical interconnect wires 612. The two-wire system 600 further includes a thermal sensing element 626 bridging the pair of electrical interconnect wires 612. The pair of electrical interconnect wires 612 are in communication with an electronic control unit 622.

The two-wire system 600 further includes a set of diagnostic resistors 630 in communication with the pair of electrical interconnect wires 612. A first resistor 632 bridges the pair of electrical interconnect wires 612 and is in a parallel configuration with the fluid level switch 624 and/or the thermal sensing element 626. The first resistor 632 has a first end 634 and a second end 636. A second resistor 638 is arranged in series with the first resistor between the first end 634 and the electronic control unit 622. A third resistor 640 is arranged in series with the first resistor between the second end 636 and the electronic control unit 622.

In the case of an electrical short arising from a short to ground in the first electrical interconnect wire 614, the electronic control unit 622 will read both interconnect wires 612 as indicating ground potential. In the case of an electrical short arising from a short to ground in the second interconnect wire 616, the electronic control unit will read the second interconnect wire 616 as indicating ground potential. In the case of a short to source voltage in the first electrical connect wire 614, the electronic control unit will read the first electrical connect wire 614 as indicating source voltage potential. In the case of a short to source voltage in the second electrical connect wire 616, the electronic control unit will read both of the electrical interconnect wires 612 as indicating source voltage potential. Finally, in the case of an open circuit (such as a disconnected switch), both interconnect wires 612 will indicate open circuit potential determined by the ratio of the diagnostic resistors 630. In this fashion, the fluid level and fluid temperature monitoring systems can be quickly diagnosed for faults and the fault location accurately identified. In at least one exemplary illustration it is contemplated that the first resistor 632, the second resistor 638 and the third resistor 640 all have different resistor biases. Furthermore, it is contemplated that the values of the three resistors 632, 638, and 640 may be chosen to minimize noise interference in the two-wire circuit. Circuits are always susceptible to noise interference when signals are picked up from the environment in which they are located. However, by balancing impedance to ground such noise can be minimized. Therefore, the values of the three resistors 632, 638, and 640 can be tailored to minimize the noise interference measured in a particular environment.

The present disclosure thereby illustrates a simple two-wire circuit assembly capable of monitoring fluid levels and fluid temperatures. The simple two-wire circuit allows individual sensors or switches to be bypassed during extreme triggering events to prevent false readings. They system also provides a method of monitoring and diagnosing faults in the system to facilitate easy repair.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claims.

Accordingly, it is to be understood that the above description is intended to be illustrative and not restrictive. Many examples and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A two-wire system for monitoring fluid level and temperature comprising:
    a pair of electrical interconnect wires;
    a fluid level switch bridging said electrical interconnect wires;
    a thermal sensing element bridging said electrical interconnect wires;
    wherein:
        one of said fluid level switch and said thermal sensing element bypasses the other during a trigger event:
        said thermal sensing element comprises a thermal limit switch, said thermal limit switch biased open and triggered to close at a trigger temperature; and
        said fluid level switch biased closed and triggered to open at a fluid trigger level.

2. The two-wire system as described in claim 1, further comprising:
    a thermal limit bias resistor; and
    a sensor bias resistor.

3. The two-wire system as described in claim 2, wherein said sensor bias resistor has a resistance greater than the switch contact resistance of said fluid level switch.

4. The two-wire system as described in claim 2, wherein said thermal limit bias resistor has a resistance greater than the switch contact resistance of said fluid level switch.

5. The two-wire system as described in claim 1, wherein said thermal sensing element comprises:
    a thermal variable sensing element; and
    a thermal non-variable resistive element.

6. The two-wire system as described in claim 5, wherein said fluid level switch is biased open and triggered to close at a fluid trigger level.

7. A two-wire system for monitoring fluid level and temperature comprising:
a single pair of electrical interconnect wires;
a fluid level switch providing a first electrical pathway between said single pair of electrical interconnect wires; and
a thermal sensing element providing a second electrical pathway between said single pair of electrical interconnect wires;
wherein:
said fluid level switch and said thermal sensing element operate in concert to provide a single signal in said single pair of electrical interconnect wires;
said thermal sensing element comprises a thermal limit switch, said thermal limit switch biased open and triggered to close at a trigger temperature; and
said fluid level switch biased closed and triggered to open at a fluid trigger level.

8. A method of monitoring fluid level and temperature comprising:
monitoring a pair of electrical interconnect wires;
sensing a fluid level using a fluid level switch bridging said electrical interconnect wires;
sensing a fluid temperature using a thermal sensing element bridging said electrical interconnect wires;
triggering said fluid level switch to open at a fluid trigger level; and
triggering said thermal sensing element to close at a trigger temperature, said thermal sensing element comprising a thermal limit switch;
wherein one of said fluid level switch and said thermal sensing element bypasses the other during a trigger event.

9. A two-wire system for monitoring fluid level and temperature comprising:
a pair of electrical interconnect wires;
a fluid level switch bridging said electrical interconnect wires;
a thermal sensing element bridging said electrical interconnect wires;
one of an analog gauge and an electronic control unit in communication with said single pair of electrical interconnect wires;
a monitoring device configured to determine a fluid temperature when said fluid level switch is biased open and to signal a fluid level when said fluid level switch is triggered to close;
wherein:
one of said fluid level switch and said thermal sensing element bypasses the other during a trigger event;
said thermal sensing element comprises a thermal variable sensing element;
said fluid level switch is biased open and triggered to close at a low fluid trigger level.

10. The two-wire system as described in claim 9, further comprising:
a magnetic float;
wherein said fluid level switch is triggered by said magnetic float.

11. The two-wire system as described in claim 10, wherein said fluid level switch disconnects said thermal sensing element when said fluid level switch is closed.

12. A two-wire system for monitoring fluid level and temperature comprising:
a pair of electrical interconnect wires;
a fluid level switch bridging said electrical interconnect wires;
a thermal sensing element bridging said electrical interconnect wires;
an electronic control unit in communication with said pair of electrical interconnect wires;
a first resistor bridging said electrical interconnect wires and having a first end and a second end, said first resistor arranged in parallel with said fluid level switch;
a second resistor arranged in series with said first resistor and connected to said first end and said electronic control unit; and
a third resistor arranged in series with said first resistor and connected to said second end and said electronic control unit;
wherein:
said electronic control unit utilizes said pair of electrical interconnect wires to diagnose an electrical short location; and
one of said fluid level switch and said thermal sensing element bypasses the other during a trigger event.

13. The two-wire system as described in claim 12, wherein said electronic control unit diagnoses an open circuit fault by the ratio of the first, second, and third resistors.

14. A two-wire system for monitoring fluid level and temperature comprising:
a single pair of electrical interconnect wires;
a fluid level switch providing a first electrical pathway between said single pair of electrical interconnect wires; and
a thermal sensing element providing a second electrical pathway between said single pair of electrical interconnect wires;
a monitoring device in communication with said single pair of electrical interconnect wires;
wherein:
said fluid level switch and said thermal sensing element operate in concert to provide a single signal in said single pair of electrical interconnect wires;
said thermal sensing element comprises a thermal variable sensing element;
said fluid level switch is biased open and triggered to close at a fluid trigger level; and
said monitoring device is configured to determine a fluid temperature when said fluid level switch is biased open and to signal a fluid level when said fluid level switch is triggered to close.

15. The two-wire system as described in claim 14, further comprising:
a first resistor bridging said single pair of electrical interconnect wires and having a first end and a second end;
a second resistor arranged in series with said first resistor and connected to said first end; and
a third resistor arranged in series with said first resistor and connected to said second end; and
wherein said monitoring device said first, second and third to diagnose a circuit fault.

16. A method of monitoring fluid level and temperature comprising:
monitoring a pair of electrical interconnect wires;
sensing a fluid level using a fluid level switch bridging said electrical interconnect wires;
sensing a fluid temperature using a thermal sensing element bridging said electrical interconnect wires;
monitoring said thermal sensing element utilizing a monitoring device to determine a fluid temperature;
displaying said fluid temperature when said fluid level switch is in an open position; and displaying a fluid level when said fluid level switch is in a closed position, said fluid level switch biased open and triggered to close at a fluid trigger level;

wherein one of said fluid level switch or said thermal sensing element bypasses the other during a trigger event.

17. A two-wire system for monitoring fluid level and temperature comprising:
- two electrical interconnect wires;
- a fluid level element bridging said wires;
- a thermal sensing element bridging said wires;
- wherein:
    - one of said fluid level element and said thermal sensing element bypasses the other during a trigger event:
    - said thermal sensing element triggered to close at a trigger temperature; and
    - said fluid level element triggered to open at a fluid trigger level.

18. The two-wire system as described in claim 17, wherein said fluid level element is a fluid level switch.

19. The two-wire system as described in claim 18, wherein said fluid level switch is biased closed.

20. The two-wire system as described in claim 17, wherein said thermal sensing element is a thermal limit switch.

21. The two-wire system as described in claim 20, wherein said thermal limit switch is biased open.

* * * * *